United States Patent [19]

Sato et al.

[11] 4,276,135

[45] Jun. 30, 1981

[54] PHOTOCURABLE ORGANOPOLYSILOXANE COMPOSITIONS

[75] Inventors: Yasuhiko Sato; Jun Koizumi; Yuji Tokushige, all of Annaka, Japan

[73] Assignee: Shin-Etsu Chemical Co. Ltd., Tokyo, Japan

[21] Appl. No.: 87,344

[22] Filed: Oct. 23, 1979

[30] Foreign Application Priority Data

Nov. 6, 1978 [JP] Japan ................................ 53-136508

[51] Int. Cl.³ ...................... B32B 15/08; B32B 27/16; C08F 2/50; C08F 30/08
[52] U.S. Cl. ...................... 204/159.13; 260/42.26; 428/413; 428/418; 428/461; 525/502; 525/925; 526/279; 556/418; 428/447
[58] Field of Search .................................... 204/159.13

[56] References Cited

U.S. PATENT DOCUMENTS

| | | | |
|---|---|---|---|
| 3,865,588 | 2/1975 | Ohto et al. | 204/159.13 |
| 4,026,826 | 5/1977 | Yoshida et al. | 204/159.13 |
| 4,201,808 | 5/1980 | Cully et al. | 204/159.13 |
| 4,208,471 | 6/1980 | Bresak et al. | 204/159.13 |

Primary Examiner—John C. Bleutge
Assistant Examiner—A. H. Koeckert
Attorney, Agent, or Firm—Toren, McGeady and Stanger

[57] ABSTRACT

A novel photocurable organopolysiloxane composition is proposed capable of giving a cured product having a very high anti-moisture resistance even at an elevated temperature to withstand a treatment in boiling water for 1 hour or longer without coming off from the substrate surface on which it has been applied and cured by irradiation with light. The composition comprises a specific acryloyloxy-containing organopolysiloxane as the base component, an epoxy compound and a photosensitizer. The composition is suitable, for example, for providing a moisture-proof overcoating on various electronic parts such as a capacitor.

11 Claims, No Drawings

PHOTOCURABLE ORGANOPOLYSILOXANE COMPOSITIONS

BACKGROUND OF THE INVENTION

The present invention relates to a novel photocurable organopolysiloxane composition which is curable with a very small dose of light irradiation with its extremely high photosensitivity and capable of giving a photocured product with high moisture-resistance in the adhesive bonding strength to various substrates.

There have been known hitherto several types of organopolysiloxane compositions curable by irradiation with light, in particular, rich in ultraviolet. These prior art photocurable organopolysiloxane compositions are, however, defective in their relatively poor anti-moisture resistance and strength of adhesive bonding after photocuring so that the cured films thereof come apart from the substrate surface on which they have been photocured, especially, when the cured films are exposed to an atmosphere of high humidity and at a relatively high temperature. For example, the adhesive bonding strength of a cured film of a photocurable organopolysiloxane composition obtained by the application on to the surface of a substrate such as a metal or a ceramic material followed by irradiation with light is greatly reduced by heating it in boiling water for about 1 hour or longer. The photocured film with thus reduced bonding strength to the substrate surface is readily and almost completely removed from the substrate surface when an adhesive tape is applied thereto and then peeled off so that the usefulness of it in the practical use is greatly reduced.

SUMMARY OF THE INVENTION

It is therefore an object of the present invention to provide a novel organopolysiloxane composition curable by irradiation with light of a very small dose to give a cured composition which is highly resistant to the attack of moisture in a hot and humid atmosphere so as that the strength of adhesive bonding of the cured composition to various kinds of substrate surfaces is sufficiently retained even after prolonged exposure to such an adverse atmosphere to be free from the above described problems and drawbacks in the prior art photocurable organopolysiloxane compositions.

The photocurable organopolysiloxane composition of the present invention comprises (a) 100 parts by weight of an acryloyloxy-containing organopolysiloxane represented by the average unit formula

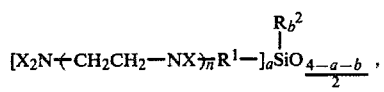

$$[X_2N(\!-\!CH_2CH_2\!-\!NX\!)_{\overline{n}}R^1\!-\!]_a SiO_{\frac{4-a-b}{2}}, \quad (I)$$

where $R^1$ is a divalent hydrocarbon group, $R^2$ is a monovalent hydrocarbon group, at least one of the groups denoted by X in the square brackets is an acryloyloxy-substituted 2-hydroxyalkyl group represented by the general formula

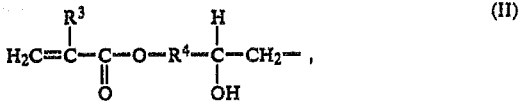

in which $R^3$ is a hydrogen atom or an alkyl group having from 1 to 4 carbon atoms and $R^4$ is a divalent hydrocarbon group, the remainder of the groups X each being a hydrogen atom, n is zero or a positive integer not exceeding 4, a is a positive number not exceeding 3 and b is zero or a positive number smaller than 3 with the proviso that a+b is a positive number not exceeding 3, (b) from 0.01 to 50 parts by weight of an epoxy-containing compound having at least one epoxy group in a molecule, and (c) a photosensitizer.

In particular, further improvements in the inventive photocurable organopolysiloxane compositions are obtained when the epoxy-containing compound as the component (b) is an epoxy-containing organosilane compound represented by the general formula

$$R^5_c SiZ_{4-c}, \quad (III)$$

where $R^5$ is a substituted or unsubstituted monovalent hydrocarbon group and c is a positive integer of 1, 2 or 3, at least one of the groups $R^5$ in a molecule being a substituted monovalent hydrocarbon group having a substitutent with an epoxy group, and Z is a hydroxy group or a hydrolyzable atom or group.

DETAILED DESCRIPTION OF THE PREFERRED EMBODIMENTS

In the following, detailed description is given of the inventive photocurable organopolysiloxane compositions beginning with the definitions of the individual components (a) to (c).

The base component (a) is an acryloyloxy-containing organopolysiloxane represented by the average unit formula (I) above. In the formula (I), the divalent hydrocarbon group represented by the symbol $R^1$ is exemplified by alkylene groups having 1 to 4 carbon atoms such as methylene group, ethylene group, propylene group and the like. The monovalent hydrocarbon group represented by the symbol $R^2$ has 1 to 6 carbon atoms and is exemplified by alkyl groups such as methyl, ethyl, propyl and butyl groups, alkenyl groups such as vinyl and allyl groups and aryl groups such as phenyl group as well as those groups derived from the above named hydrocarbon groups by substituting part or all of the hydrogen atoms thereof with substituent atoms or groups such as halogen atoms and several kinds of sulfur-containing groups such as $HSCH_2CH_2CH_2-$ and $HOCH_2CH_2SCH_2CH_2-$. X in the formula denotes a hydrogen atom or a monovalent group represented by the general formula (II) above, in which $R^3$ is a hydrogen atom or an alkyl group having from 1 to 4 carbon atoms such as methyl, ethyl, propyl and butyl groups and $R^4$ is a divalent hydrocarbon group which may be a similar one to the group denoted by the symbol $R^1$ above.

In the average unit formula (I) given above, n is a number of zero or a positive integer not exceeding 4, a is a positive number not exceeding 3 and b is a number equal to zero or a positive number smaller than 3 with the proviso that a+b is not exceeding 3.

Among the atoms or groups denoted by X and present in one of the groups written in the square bracket, i.e.

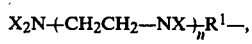

the total number of X being n+2, at least one should be the monovalent group represented by the general formula (II) in order to impart a good and reliable photocurability to the inventive compositions.

It is recommendable that, by the reasons in the photocurability and easiness in the synthetic preparation, the group $R^1$ in the average unit formula (I) for the component (a) is a propylene group, $R^2$ is a methyl, vinyl or phenyl group and the monovalent group X other than the hydrogen atoms represented by the general formula (II) is a group expressed by the structural formula

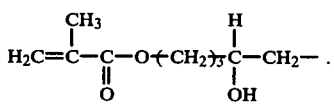 (IV)

Several of the examples of the component (a) in conformity with the above definition are as follows, in which the group $X^1$ is a group expressed by the above formula (IV) and the group $X^2$ is a group expressed by the formula

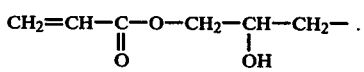 (V)

In the following exemplification, the symbols Me and Ph denote a methyl group and a phenyl group, respectively, and the values of the viscosity given in centistokes are each obtained with a xylene solution containing 40% by weight of the organopolysiloxane at 25° C.

(i) An organopolysiloxane composed of the units $[X^1{}_2NCH_2CH_2-NX^1-CH_2CH_2CH_2SiO_{1.5}]$ and the averaged units $[Ph_{0.9}Me_{0.5}SiO_{1.3}]$ in 3:8 molar ratio, 51 centistokes (ii) An organopolysiloxane composed of the units $[X^1{}_xNCH_2CH_2-NH-CH_2CH_2CH_2SiO_{1.5}]$ and the averaged units $[Ph_{1.1}Me_{0.3}SiO_{1.3}]$ in 4:9 molar ratio, 4.3 centistokes (iii) An organopolysiloxane composed of the units $[X^1{}_2NCH_2CH_2CH_2SiO_{1.5}]$ and the averaged units $[Ph_{0.4}Me_{0.7}SiO_{1.4}]$ in 3:10 molar ratio, 3.7 centistokes (iv) An organopolysiloxane composed of the units $[X^2{}_2NCH_2CH_2-NX^2-CH_2CH_2CH_2SiMeO]$ and the averaged units $[Ph_{1.0}Me_{0.5}SiO_{1.25}]$ in 3:7 molar ratio, 6.2 centistokes (v) An organopolysiloxane composed of the units $[X^2{}_2NCH_2CH_2CH_2SiO_{1.5}]$ and the averaged units $[Me_{1.1}SiO_{1.45}]$ in 1:5 molar ratio, 11.0 centistokes (vi) An organopolysiloxane composed of the units $[X^2NH-CH_2CH_2CH_2SiO_{1.5}]$ and the averaged units $[Ph_{1.1}SiO_{1.45}]$ in 2.3 molar ratio, 1.3 centistokes The acryloyloxy-containing organopolysiloxane as the component (a) represented by the average unit formula (I) can be prepared by several synthetic methods. The first of the methods is a reaction of an amino-containing organopolysiloxane represented by the average unit formula

 (VI)

where $R^1$, $R^2$, n, a and b each have the same meaning as defined above for the average unit formula (I), and a glycidyl-containing acrylic ester represented by the general formula

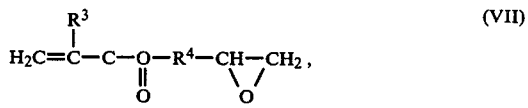 (VII)

where $R^3$ and $R^4$ each have the same meaning as defined for the general formula (II).

An alternative method for the preparation of the component (a) is a dehydration condensation or a dealcoholation condensation between an organopolysiloxane having at least one hydroxy group or alkoxy group in a molecule and an organosilane represented by the general formula

 (VIII)

where the symbols $R^1$, $R^2$, X and n each have the same meaning as defined above for the average unit formula (I), $R^6$ is a hydrogen atom or an alkyl group having from 1 to 4 carbon atoms, d is a positive integer not exceeding 3 and e is a number equal to zero or a positive number of 1 or 2 with the proviso that d+e is a positive integer not exceeding 3.

In the next place, the component (b) which is an epoxy-containing compound having at least one epoxy group in a molecule is exemplified by allyl glycidyl ether, butyl glycidyl ether, glycidyl methacrylate, 3,4-epoxy-6-methylcyclohexane carboxylate, vinylcyclohexene dioxide, dipentene dioxide, dicyclopentadiene dioxide, bis(3,4-epoxy-6-methylcyclohexylmethyl) adipate, diglycidyl ester of tetrahydrophthalic acid, diglycidyl ester of hexahydrophthalic acid, diglycidyl phthalate, phenol-novolac epoxy resins, triglycidyl isocyanurate, bisphenol A-type epoxy resins prepared with bisphenol A and epichlorohydrine, several epoxy compounds obtained by partial modification of the above named epoxy compounds with fatty acids, and the like. Among the above mentioned epoxy compounds, epoxy resins of the bisphenol A type are the most preferred from the standpoint of the balance between the lower cost and the relatively good photocurability.

It is of course optional that two kinds or more of the above epoxy compounds are used in combination. In this connection, it is recommendable that the above mentioned epoxy resin of the bisphenol A type is used as combined with a phenol-novolac epoxy resin, triglycidyl isocyanurate or the like in order to obtain improved heat resistance, anti-solvent resistance and anti-chemicals resistance.

Another class of the epoxy-containing compounds more useful as the component (b) in the inventive compositions is an epoxy-containing organosilane compound represented by the general formula (III) given above, in which $R^5$ is a substituted or unsubstituted monovalent hydrocarbon group and at least one of the groups $R^5$ in a molecule is a substituted monovalent hydrocarbon group having a substituent group involving an epoxy group. Such an epoxy-containing group represented by $R^5$ can be a linear-chained group or an alicyclic group. The symbol Z in the formula (III) denotes a hydroxy group or a hydrolyzable atom or group as exemplified by halogen atoms, alkoxy groups, acyloxy groups, substituted or unsubstituted amino groups, amide groups, aminoxy groups, ketoxime groups, vinyloxy groups and the like. In addition, the hydrolysis products or hydrolysis-condensation products of the silane compounds having one or more of the above named hydrolyzable atoms or groups in a molecule may be used.

Preferred examples of the epoxy-containing silane compound are 3-glycidyloxypropyl trimethoxysilane, 2-(3,4-epoxycyclohexyl)ethyl trimethyoxysilane, 3-glycidyloxypropyl triethoxysilane, 3-glycidyloxypropyl methyldimethoxysilane, 3-glycidyloxypropyl dimethylmethoxysilane, 3-glycidyloxypropyl dimethylethoxysilane, di(3-glycidyloxypropyl) dimethoxysilane, di(3-glycidyloxypropyl) diethoxysilane, di(3-glycidyloxypropyl) methylmethoxysilane, di(3-glycidyloxypropyl) methylethoxysilane, 2-(3,4-epoxycyclohexyl)ethyl methyldimethoxysilane, 2-(3,4-epoxycyclohexyl)ethyl dimethylmethoxysilane, 3-glycidyloxypropyl triacetoxysilane, 3-glycidyloxypropyl triaminoxysilane, 2-(3,4-epoxycyclohexyl)ethyl triacetoxysilane, 2-(3,4-epoxycyclohexyl)ethyl triaminoxysilane and partial hydrolysis-condensation products of these hydrolyzable silanes having a degree of polymerization of about 10 or smaller.

Typical examples of the organopolysiloxanes as the above mentioned hydrolysis-condensation products are given by the following structural formulas.

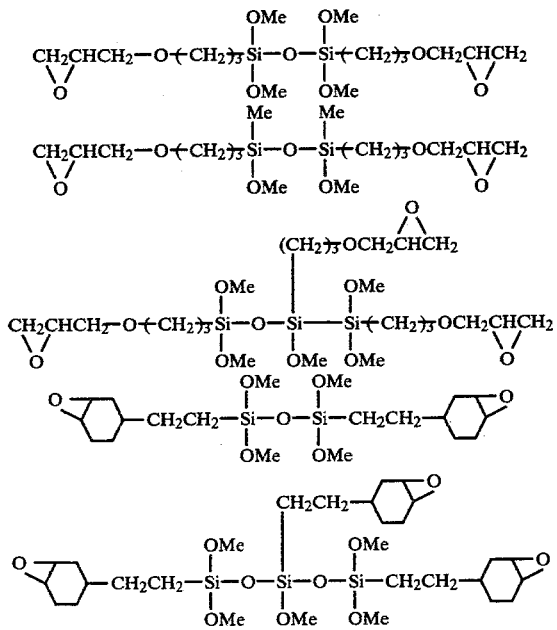

The amount of the epoxy-containing compound as the component (b) in the inventive composition is in the range from 0.1 to 20 parts by weight or, preferably, from 1 to 10 parts by weight per 100 parts by weight of the component (a). Any smaller amounts than above cannot impart sufficient anti-moisture bonding strength to the cured composition whereas an excessive amount over the above range results in a decreased relative concentration of the photosensitive acryloyloxy groups in the composition leading, consequently, to a decreased photocurability.

The photosensitizer as the component (c) in the inventive composition is also not limited to a specific type but may be selected from a wide variety of compounds known in the art as the photosensitizer. Several of the examples of the photosensitizers useful in the invention are benzoin and derivatives thereof such as benzoin ethers, e.g. benzoin methyl ether, benzyl and derivatives thereof, aryl diazonium salts, anthraquinone and derivatives thereof, acetophenone and derivatives thereof, certain sulfur-containing compounds such as diphenyl disulfide, benzophenone and derivatives thereof and the like. These photosensitizers may be used either singly or as a combination of two or more according to need.

The amount of the photosensitizer as the component (c) in the inventive composition is in the range from 0.01 to 30 parts by weight or, preferably, in the range from 0.01 to 10 parts by weight per 100 parts by weight of the component (a). When a relatively large amount of the photosensitizer is to be used, it should be taken into account that the photosensitizer be sufficiently compatible with the other components. Any smaller amounts of the photosensitizer than 0.01 parts by weight naturally cannot give a sufficiently high velocity of photocuring to the composition along with rather inferior electrical and mechanical properties of the films of the cured composition whereas an excessive amount of the photosensitizer results in brittleness as well as extremely lowered electrical properties of the cured composition to an undesirable extent, in any way, from the standpoint of practical use. In most cases, sufficient photosensitizing effects can be ensured by formulating from 0.1 to 5 parts by weight of the photosensitizer per 100 parts by weight of the component (a).

The photocurable composition of the present invention can be obtained by merely blending the above described components (a), (b) and (c) uniformly. If convenient and desirable, it is optional to use a suitable organic solvent such as aromatic hydrocarbons, e.g. toluene and xylene, ketones or alcohols, in which the component (a) is first dissolved followed by the addition of the components (b) and (c) and, if necessary, removal of the solvent.

Alternatively, the components (a) and (b) are dissolved together in an organic solvent to give a solution which is subjected to a heat treatment, whereby partial addition reaction may supposedly take palce between these two components, and then the component (c) is admixed to the solution uniformly followed by, if necessary, removal of the solvent.

It is sometimes advisable that a viscosity-improver is added to the composition in order to facilitate the application of the composition to a substrate surface or dipping of a substrate in the composition. The compound suitably used as the viscosity-improver is a vinylic or acrylic monomer polymerizable by addition polymerization having a boiling point of 100° C. or higher under atmospheric pressure. Several of the examples are styrene and derivatives thereof such as vinyltoluene, acrylic acid and esters thereof such as butyl acrylate, methacrylic acid and esters thereof such as ethyl methacrylate, polyfunctional acrylic and methacrylic esters such as 1,6-hexanediol diacrylate, ethyleneglycol dimethacrylate and trimethylolpropane trimethacrylate, polyester oligomers having acryloyloxy or methacryloyloxy groups available, for example, by the trade name of ARONIX 6300 from Toa Gosei Kagaku Kogyo Co., Japan, other polyfunctional vinyl or allyl compounds such as divinylbenzene and diallyl phthalate, and the like. These monomeric compounds may be used either singly or as a combination of two or more.

The amount of the viscosity-improver, when used, should not exceed 500 parts by weight or, in most cases, 200 parts by weight per 100 parts by weight of the total amount of the components (a), (b) and (c) since an excessive amount of the viscosity-improver produces undesirable effects on the electrical properties, mechanical properties and heat resistance of the cured films of the composition.

In addition to the viscosity-improver above described, it is optional, according to need, that the inventive composition is formulated by the addition of appropriate amounts of fillers, thixotropy-improvers, coloring agents, anti-oxidants, adhesion-improvers, surface driers, free-radical polymerization initiators and the like.

Examples of the fillers are aluminum oxide, silicon dioxide, titanium dioxide, barium sulfate, mica powder and the like, and a finely divided silicon dioxide having a specific surface area of 100 to 450 $m^2/g$ is suitable as a thixotropy-improver. The coloring agents may be inorganic and organic pigments including phthalocyanine green and phthalocyanine blue as well as any kinds of organic dyes.

Effective anti-oxidants are a class of ordinary inhibitors for thermal polymerization including hydroquinone, hydroquinone methyl ether, catechol, 2,6-di-tert-butyl-4-methylphenol and the like, and so-called silane coupling agents are useful as the adhesion-improver including 3-methyacryloxypropyl trimethoxysilane, vinyl tris(2-methoxyethoxy)silane, N-(2-aminoethyl)-3-aminopropyl trimethoxysilane, 3-aminopropyl triethoxysilane, N-(2-aminoethyl)-3-aminopropyl methyldimethoxysilane and the like. In particular, N-(2-aminoethyl)-3-aminopropyl trimethoxysilane and 3-aminopropyl triethoxysilane are preferred.

Examples of effective surface driers are metal salts of an organic acid such as cobalt naphthenate, manganese octoate and the like.

The addition of a filler is not essential in the inventive composition but, when a filler is formulated, the viscosity of the composition is desirably within the range from 100 to 250,000 centipoise at room temperature as in the absence of a filler depending on the process for applying the composition on to a substrate surface such as screen printing process, spraying, brushing and dipping.

The composition of the present invention is cured by irradiation with light and the light source for irradiation may be a high pressure mercury lamp, ultra-high pressure mercury lamp, metal halide lamp, carbon arc lamp, xenon lamp or the like.

The cured products of the inventive photocurable composition are very excellent in their electrical properties or, in particular, in the characteristics of the frequency and temperature dependency of the dielectric constant and the dielectric tangent along with the heat resistance capable of withstanding a temperature of 150° C. or higher and anti-moisture resistance withstanding a boiling treatment in water for 1 hour or longer.

Following are the examples and comparative examples to illustrate the present invention in further detail, in which parts are all given by parts by weight.

EXAMPLE 1

A mixture composed of 860 g of a xylene solution containing 70% by weight of a methylphenylpolysiloxane containing 5% by weight of hydroxy groups directly bonded to the silicon atoms and having a viscosity of 52 centistokes at 25° C. with a methyl/phenyl molar ratio of 1.6, 150 g of N-(2-aminoethyl)-3-aminopropyl trimethoxysilane, 870 g of xylene and 0.5 g of potassium hydroxide as an equilibration catalyst was heated at 88° C. under reflux for 8 hours followed by the removal of 45 g of methyl alcohol as the condensation product by distilling off with temperature elevation up to 126° C. to give a xylene solution of an amino-containing organopolysiloxane.

In the next place, 260 g of glycidyl methacrylate was introduced into the above obtained xylene solution of the amino-containing organopolysiloxane and the mixture was heated at 70° C. for 3 hours to effect the addition reaction between the amino groups and the epoxy groups to form a methacryloyloxy-containing organopolysiloxane in a form of a xylene solution. Then, a mixture of 2 g of trimethylchlorosilane as a neutralizing agent and 2 g of xylene and 1.5 g of potassium acetate were added to the solution with agitation at 60° C. for 1 hour followed by filtration under atmospheric pressure with addition of 30 g of diatomaceous earth as a filter aid. Removal of xylene, unreacted trimethylchlorosilane and other volatile materials from the filtrate by distillation gave a clear, slightly yellowish viscous liquid product having a viscosity of 126,000 centipoise at 25° C., which was identified by infrared and NMR absorption spectral analyses to be a methacryloyloxy-containing organopolysiloxane.

An organopolysiloxane coating composition was prepared by uniformly blending 100 parts of the above obtained acryloyloxy-containing organopolysiloxane, 20 parts of 1,6-hexanediol dimethacrylate, 0.5 part of 4-methoxybenzophenone, 5 parts of a commercially available epoxy resin (Epikote 815, a product of Shell Chemical Co. having a viscosity of 10 poise at 25° C. and an epoxy equivalent of 190) and 5 parts of N-(2-aminoethyl)-3-aminopropyl trimethoxysilane available by the trade name of KBM-603 from Shin-Etsu Chemical Co., Japan, and the composition was applied on to an alumina plate and subjected to irradiation with light emitted from a high pressure mercury lamp of a power of 3.2 kilowatts placed 12 cm apart from the plate for about 1 minute to give a cured film of the composition in about 100 μm thickness. The thus coated alumina plate was heated for 1 hour in boiling water and measurements of several properties were undertaken for the thus heated coating film after drying.

The results of testing were as follows.

(i) Pencil hardness of the coating film: 3H (ii) Cross-check cut test: 100/100

(iii) Cross-cut peeling test: the coating film was cut with a razor blade in two directions intersecting at an angle of 30° C. and overlaid with an adhesive tape which was then peeled off but the coating film was not removed from the substrate surface.

(iv) Anti-solvent resistance: the coating film on the alumina plate was dipped and kept standing for 10 minutes in 1,1,1-trichloroethane at room temperature with or without irradiation of ultrasonic waves but the coating film remained as firmly bonded to the surface without coming off.

(v) Heat resistance: the coating film on the alumina plate was dipped in molten solder at 230° C. for 2 minutes without no recognizable changes in the appearance.

(vi) Dielectric constant in a frequency range of 0.1 to 100 kHz at a temperature of 20° to 150° C.: 2.9 to 3.6

(vii) Dielectric tangent in a frequency range of 0.1 to 10 kHz at a temperature of 20° to 150° C.: 0.9 to 1.8%

(viii) Thermal degradation test: a heat treatment of 1000 hours at 200° C. produced almost no changes in the dielectric constant and dielectric tangent excepting slight coloring in yellow.

EXAMPLE 2

A mixture composed of 860 g of a xylene solution containing 70% by weight of the same methylphenylpolysiloxane as in Example 1, 150 g of N-(2-aminoethyl)-3-aminopropyl trimethoxysilane, 870 g of xylene and 0.2 g of potassium hydroxide as an equilibration catalyst was heated at 88° C. for 8 hours under reflux followed by temperature elevation up to 126° C. taking about 1 hour where 45 g of methyl alcohol produced by the condensation reaction was removed by distilling off to give a xylene solution of an amino-containing organopolysiloxane.

In the next place, 260 g of glycidyl methacrylate was added dropwise into the above obtained xylene solution of the amino-containing organopolysiloxane kept at 60° C. over a period of 1 hour followed by aging for 3 hour at the temperature to effect the addition reaction between the amino groups and the epoxy groups to give a methacryloyloxy-containing organopolysiloxane in a xylene solution, into which 30 g of an epoxy resin (Epikote 815) was further added and kept at 60° C. for additional 1 hour. Then, a mixture of 2 g of trimethylchlorosilane as a neutralizing agent and 4 g of xylene and 15 g of potassium acetate were introduced into the solution followed by agitation at 50° C. for 2 hours and then standing at room temperature for 3 hours. After complete settling of the precipitate formed by neutralization, the reaction mixture was filtered under atmospheric pressure with addition of 30 g of diatomaceous earth as a filter aid and the filtrate was subjected to distillation under a reduced pressure of 2 mmHg at 60° C. taking about 6 hours to remove xylene, trimethylchlorosilane and other volatile meterials whereby a clear, slightly yellowish viscous liquid product having a viscosity of 75,000 centipoise at 25° C. was obtained.

An organopolysiloxane coating composition was prepared by uniformly blending 100 parts of the above prepared liquid product containing the methacryloyloxy-containing organopolysiloxane and the epoxy resin, 20 parts of ethyleneglycol dimethacrylate, 20 parts of ARONIX 6300 (a product of Toa Gosei Kagaku Kogyo Co., Japan) and 0.5 part of benzophenone and the composition was applied to the surface of a ceramic plate of IC grade and subjected to irradiation for about 20 seconds with light emitted from a metal halide lamp of a power of 3 kilowatts placed 15 cm apart from the plate to give a cured film of the composition having a thickness of about 100 μm. The cured coating film on the substrate surface was heated for 1 hour in boiling water and, after drying, subjected to the cross-cut peeling test by use of an adhesive tape. The coating film thus treated, indicating no recognizable changes in its appearance, was completely resistant in this peeling test.

EXAMPLE 3

A composition was prepared by uniformly blending by use of a three-roller mill 100 parts of the liquid product containing the methacryloyloxy-containing organopolysiloxane with admixture of the epoxy resin as prepared in Example 2 above, 10 parts of ethyleneglycol dimethacrylate, 30 parts of ARONIX 6300, 5 parts of Epikote 815, 5 parts of 3-aminopropyl triethoxysilane available by the trade name of KBE-903 from Shin-Etsu Chemical Co., Japan, 0.5 part of 4-methoxybenzophenone, 0.5 part of 2-methylanthraquinone, 50 parts of a fine powder of α-alumina having an average particle diameter of 1 μm, 7 parts of a finely divided silicon dioxide powder having a specific surface area of 380 $m^2/g$, 2 parts of phthalocyanine green and 3 parts of 3-methacryloxypropyl trimethoxysilane and the compositon was applied on to the surface of a ceramic substrate of IC grade in a thickness of about 20 μm by use of an ordinary screen printing machine followed by irradiation for about 20 seconds with light from a metal halide lamp of 3 killowatt power placed 10 cm apart from the substrate to give a cured coating film of smooth appearance.

The cured coating film had no pin holes and a pencil hardness of 5H or higher. The adhesion of the coating film to the substrate surface was good even after reflowing with molten solder and no change was recognized even after immersion in 1,1,1-trichloroethane as a solvent conventionally used for washing of the soldering flux at room temperature for 30 minutes without or 5 minutes with irradiation of ultrasonic waves indicating the excellent anti-solvent resistance of the cured coating film. The cross-cut peeling test with an adhesive tape undertaken after heating in boiling water for 1 hour indicated no decrease in the adhesion of the coating film to the substrate surface.

EXAMPLE 4

A thick-film capacitor was prepared by forming successively a lower electrode, a dielectric layer and an upper electrode on 96%-pure alumina substrate of 20 mm×20 mm×1 mm dimensions. Thus, the alumina substrate was first coated by screen printing process with a pasty electrode material containing an alloy of palladium and silver (ESL 9630, a product of Electroscience Laboratories Inc.) followed by baking at 950° C. for 10 minutes to give a lower electrode of 10 μm thickness, the dielectric layer of 50 μm thickness was formed by applying a barium titanate-based dielectric material (Dp 8289, a product of E.I. DuPont de Nemours Co.) followed by drying at 130° C. for 20 minutes, and finally the upper electrode of 10 μm thickness was formed in the same manner as for the lower electrode with the palladium-silver electrode material and baking at 950° C. for 10 minutes.

The thus prepared thick-film capacitor was provided with an overcoating of the layer of the resin composition prepared in Example 2 by brushing followed by irradiation with light from a metal halide lamp of 3 kilowatt power placed 10 cm apart from the capacitor for 30 seconds to have the composition photocured.

The resin-coated thick-film capacitor was subjected to a loading test at an elevated temperature by applying a DC voltage of 75 volts in an atmosphere of 150° C. and a loading test in a constant humidity by applying a DC voltage of 75 volts in an atmosphere of 95% relative humidity at 40° C. each for a period of 1000 hours to establish that the capacitor was very stable with no decrease in the break-down voltage showing excellent heat resistance and anti-moisture adhesive strength.

EXAMPLE 5

A composition was prepared by uniformly blending 100 parts of the methacryloyloxy-containing organopolysiloxane prepared in Example 1, 40 parts of 2-hydroxyethyl methacrylate, 0.5 part of 4-methoxybenzophenone, 3 parts of 3-glycidoxypropyl trimethoxysilane and 5 parts of N-(2-aminoethyl)-3-aminopropyl trimethoxysilane (KBM-603, a product of Shin-Etsu Chemical Co., Japan) and the composition was applied on to an alumina substrate and irradiated with light from a high pressure mercury lamp of 3.2 kilowatt power placed 12 cm apart from the substrate for about 1 minute to give a cured coating film of about 100 µm thickness.

The properties of the coating film on the alumina substrate were examined after dipping in boiling water for 1 hour in the same manner as in Example 1 except that the test of the anti-solvent resistance was carried out with a 1:1 by volume mixture of 1,1,1-trichloroethane and n-butylcarbitol and the results were also about the same as in Example 1 excepting for the values of the dielectric constant of 2.8 to 3.8 and the dielectric tangent of 0.7 to 1.9%.

EXAMPLE 6

The same amino-containing organopolysiloxane in the form of a xylene solution as in Example 2 was prepared in the same manner. Into this xylene solution of the amino-containing organopolysiloxane was added dropwise a mixture of 260 g of glycidyl methacrylate and 25 g of a partial hydrolysis-condensation product of 3-glycidoxypropyl trimethoxysilane at 60° C. over a period of 1 hour followed by aging for 3 hours to effect the addition reaction between the amino groups and the epoxy groups whereby a methacryloyloxy-containing organopolysiloxane in the form of a xylene solution was obtained. Then, a mixture of 2 g of trimethylchlorosilane as a neutralizing agent and 4 g of xylene and 15 g of potassium acetate were introduced into the solution and agitated at 50° C. for 2 hours followed by standing for 3 hours at room temperature so that the precipitate formed by neutralization settled completely and the mixture was subjected to filtration under atmospheric pressure with addition of 30 g of diatomaceous earth as filter aid. The filtrate was subjected to distillation under a reduced pressure of 2 mmHg at 60° C. taking about 6 hours to remove xylene, trimethylchlorosilane and other volatile materials to give a clear, slightly yellowish viscous liquid product having a viscosity of 75,000 centipoise at 25° C.

A coating composition was prepared by uniformly blending 100 parts of the above obtained methacryloyloxy-containing organopolysiloxane, 20 parts of ethyleneglycol dimethacrylate, 20 parts of ARONIX M-5700 (a product of Toa Gosei Kagaku Kogyo Co.) and 0.5 part of benzophenone and the composition was applied on to an alumina substrate followed by irradiation for about 20 seconds with light from a metal halide lamp of 3 kilowatt power placed 15 cm apart from the substrate to effect photocuring of the composition. The thus cured coating film on the alumina substrate was heated in boiling water for 1 hour followed by drying to exhibit no recognizable changes in the appearance and subjected to the cross-cut peeling test with an adhesive tape to show no decrease in the adhesive strength of the coating film to the substrate surface.

EXAMPLE 7

A composition was prepared by uniformly blending in a three-roller mill 100 parts of the methacryloyloxy-containing organopolysiloxane obtained in Example 6 above, 30 parts of 2-hydroxypropyl methacrylate, 30 parts of ARONIX M-6300 (a product of Toa Gosei Kagaku Kogyo Co.), 5 parts of 3-glycidoxypropyl trimethoxysilane, 5 parts of 3-aminopropyl triethoxysilane available by the product name of KBM-903 from Shin-Etsu Chemical Co., Japan, 0.5 part of 4-methoxybenzophenone, 0.5 part of 2-methylanthraquinone, 50 parts of a fine powder of α-alumina having an average particle diameter of 1 µm, 7 parts of a finely divided powder of silicon dioxide having a specific surface area of 380 m$^2$/g, 2 parts of phthalocyanine green and 3 parts of 3-methacryloxypropyl trimethoxysilane and the composition was applied on to the surface of an alumina substrate in a thickness of about 20 µm by ordinary screen printing followed by irradiation for about 20 seconds with light from a metal halide lamp of 3 kilowatt power placed 10 cm apart from the substrate to give a cured coating film of smooth appearance.

The cured coating film had no pin holes with a pencil hardness of 5H or higher and was resistant to the reflow test with molten solder at 230° C. for 20 seconds without no decrease in the adhesive strength. The anti-solvent resistance of the coating film was also excellent as indicated by the dipping test in 1,1,1-trichloroethane at room temperature for 30 minutes without irradiation of ultrasonic waves or for 5 minutes with irradiation of ultrasonic waves to exhibit no recognizable changes. The cross-cut peeling test carried out with the coating film after heating in boiling water for 1 hour indicated that the adhesion of the coating film to the substrate surface was complete without coming off with the adhesive tape.

EXAMPLE 8

A thick-film capacitor was prepared in the same manner as in Example 4 and an overcoating was provided thereon with the coating composition prepared in Example 6 by brushing followed by irradiation for 60 seconds with light from a high pressure mercury lamp of 3.2 kilowatt power placed 15 cm apart from the capacitor to effect photocuring of the composition.

The capacitor provided with the overcoating of the cured film of the organopolysiloxane composition was subjected to the same loding tests as in Example 4 except that the temperature in the constant-humidity test was increased to 60° C. instead of 40° C. and the testing time in each of the loading tests was extended to 1500 hours instead of 1000 hours to show no decrease in the break-down voltage of the capacitor evidencing the further improved anti-moisture resistance of the composition in comparison with that used in Example 4.

EXAMPLE 9

A composition was prepared by uniformly blending 100 parts of the methacryloyloxy-containing organopolysiloxane obtained in Example 6, 20 parts of 2-hydroxypropyl methacrylate, 5 parts of a 3-glycidoxypropyl-containing organodisiloxane, which was a partial hydrolysis-condensation product of 3-glycidoxypropyl trimethoxysilane and expressed by the structural formula

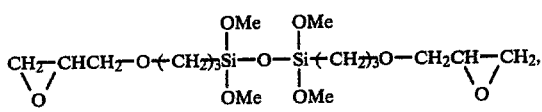

5 parts of N-(2-aminoethyl)-3-aminopropyl trimethoxysilane (KBM-603) and 1 part of 4-methoxybenzophenone. The composition was applied on to a ceramic substrate of IC grade having an undercoating with a palladium-silver paste followed by irradiation for about 20 seconds with light from a high pressure mercury lamp of 3.2 kilowatt power placed 12.5 cm apart from the substrate to have the organopolysiloxane composition photocured in layers of about 100 μm thickness. The cross-cut peeling test of the thus overcoated substrates indicated that the adhesion of the coating layers to the substrate surfaces was complete even after heating in boiling water for 1 hour and drying.

What is claimed is:
1. A photocurable organopolysiloxane composition which comprises
    (a) 100 parts by weight of an acryloyloxy-containing organopolysiloxane represented by the average unit formula

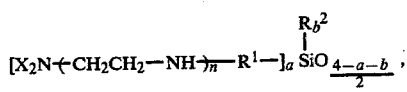

where $R^1$ is a divalent hydrocarbon group, $R^2$ is a monovalent hydrocarbon group, at least one of the groups denoted by X is an acryloyloxy-substituted 2-hydroxyalkyl group represented by the general formula

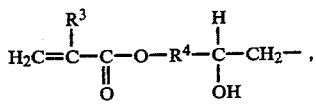

in which $R^3$ is a hydrogen atom or an alkyl group having from 1 to 4 carbon atoms and $R^4$ is a divalent hydrocarbon group, the remainder of the groups denoted by X each being a hydrogen atom, n is zero or a positive integer not exceeding 4, a is a positive number not exceeding 3 and b is zero or a positive number smaller than 3 with the proviso that a+b is a positive number not exceeding 3,
    (b) from 0.1 to 20 parts by weight of an epoxy-containing compound having at least one epoxy group in a molecule, and
    (c) a photosensitizer.
2. The photocurable organopolysiloxane composition as claimed in claim 1 wherein the divalent hydrocarbon group denoted by the symbol $R^1$ is an alkylene group selected from the class consisting of methylene, ethylene and propylene groups.
3. The photocurable organopolysiloxane composition as claimed in claim 1 wherein the divalent hydrocarbon group denoted by the symbol $R^4$ is an alkylene group selected from the class consisting of methylene, ethylene and propylene groups.
4. The photocurable organopolysiloxane composition as claimed in claim 1 wherein the divalent hydrocarbon group denoted by the symbol $R^1$ is a propylene group.
5. The photocurable organopolysiloxane composition as claimed in claim 1 wherein the group denoted by the symbol X other than hydrogen atoms is a group expressed by the structural formula

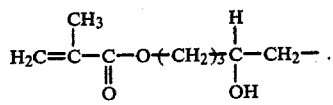

6. The photocurable organopolysiloxane composition as claimed in claim 1 wherein the epoxy-containing compound is selected from the class consisting of allyl glycidyl ether, butyl glycidyl ether, glycidyl methacrylate, 3,4-epoxy-6-methylcyclohexyl-3,4-epoxy-6-methylcyclohexane carboxylate, vinylcyclohexane dioxide, dipentene dioxide, dicyclopentadiene dioxide, bis(3,4-epoxy-6-methylcyclohexylmethyl) adipate, diglycidyl tetrahydrophthalate, diglycidyl hexahydrophthalate, diglycidyl phthalate, phenol-novolac epoxy resins, triglycidyl isocyanurate and bisphenol A-type epoxy resins.
7. The photocurable organopolysiloxane composition as claimed in claim 1 wherein the epoxy-containing compound is an epoxy-containing organosilane represented by the general formula

wherein $R^5$ is a substituted or unsubstituted monovalent hydrocarbon group, Z is a hydroxy group or a hydrolyzable atom or group and c is an integer of 1, 2 or 3, at least one of the groups denoted by $R^5$ being a substituted monovalent hydrocarbon group having a substituent with an epoxy group.
8. The photocurable organopolysiloxane composition as claimed in claim 7 wherein the epoxy-containing organosilane is selected from the class consisting of 3-glycidoxypropyl trimethoxysilane, 2-(3,4-epoxycyclohexyl) ethyl trimethoxysilane and partial hydrolysis-condensation products thereof having a degree of polymerization not exceeding about 10.
9. The photocurable organopolysiloxane composition as claimed in claim 1 wherein the amount of the photosensitizer is in the range from 0.01 to 30 parts by weight per 100 parts by weight of the component (a).
10. The photocurable organopolysiloxane composition as claimed in claim 1 further comprising a viscosity-improver which is a vinylic or an acrylic monomer polymerizable by addition polymerization and having a boiling point not lower than 100° C. under atmospheric pressure.
11. The photocurable organopolysiloxane composition as claimed in claim 10 wherein the amount of the viscosity-improver is not exceeding 500 parts by weight per 100 parts by weight of the component (a).

* * * * *